| United States Patent [19] | [11] Patent Number: 4,562,082 |
| Morimoto | [45] Date of Patent: Dec. 31, 1985 |

[54] EXTRUDED SHRIMP ANALOG FORMED FROM VEGETABLE PROTEIN AND STARCH COMPLEX

[75] Inventor: Keisuke Morimoto, Congers, N.Y.

[73] Assignee: General Foods Corporation, White Plains, N.Y.

[21] Appl. No.: 589,624

[22] Filed: Mar. 15, 1984

[51] Int. Cl.[4] ............................................. A23J 3/00
[52] U.S. Cl. .................................. 426/104; 426/574; 426/656; 426/802
[58] Field of Search ............... 426/104, 574, 802, 656, 426/657

[56] References Cited

U.S. PATENT DOCUMENTS

| 3,886,299 | 5/1975 | Feldbrugge et al. | 426/656 |
| 3,900,573 | 8/1975 | Freck et al. | 426/802 X |
| 3,925,566 | 12/1975 | Reinhart et al. | 426/802 X |
| 4,061,784 | 12/1977 | Youngquist | 426/802 X |
| 4,125,630 | 11/1978 | Orthoefer | 426/802 X |
| 4,216,240 | 8/1980 | Shirai et al. | 426/802 X |
| 4,396,634 | 8/1983 | Shenouda et al. | 426/802 X |

*Primary Examiner*—Robert Yoncoskie
*Attorney, Agent, or Firm*—Richard D. Schmidt; Joseph T. Harcarik; Daniel J. Donovan

[57] ABSTRACT

Extruded shrimp analogs are prepared from a vegetable protein and high amylose starch based composition which is in oriented fibrous form and wherein the amylose fraction is complexed with a lipid.

14 Claims, No Drawings

4,562,082

EXTRUDED SHRIMP ANALOG FORMED FROM VEGETABLE PROTEIN AND STARCH COMPLEX

BACKGROUND OF THE INVENTION

1. Field of the Invention

This invention relates to shrimp analog products formed from heat coagulable vegetable protein as a primary or sole source of protein to be used therein.

2. Description of the Prior Art

Shrimp analog products which are formulated with heat coagulable vegetable based protein such as soybean derivatives, rather than natural seafood based protein, are known in the art, see in this regard U.S. Pat. No. 3,852,484.

These products are made by extruding the vegetable protein based composition under such conditions, including a temperature of about 150° to 190° C., as to induce the formation of the protein material into an oriented, heat set, fibrous form that simulates the texture of natural seafoods.

It has also been proposed to add certain starches such as starches made from corn, wheat and rice to these protein texturization processes in an effort to improve the juiciness and chewiness qualities of the resulting extruded products. See in this regard, for example, U.S. Pat. No. 3,886,299.

These efforts to improve the juiciness and chewiness of the final products, however, have not been successful to date in providing shrimp analog products that have a level of firmness and elasticity characteristic of natural shrimp.

The extrudable prior art vegetable protein based compositions, in general, have the following compositions, based on the essential component content thereof:

| Component of Prior Art Extrudable Composition For Seafood Analog Products | Weight % Range of Component |
|---|---|
| Water | 20 to 40 |
| Heat Coagulable Vegetable Protein | 10 to 70 |
| Other Heat Coagulable Protein | ≧0 to 25 |
| Non-Heat Coagulable Protein | ≧0 to 30 |
| Starch | ≧0 to 5 | with the remainder being flavorants and colorants, to attain a total of 100%.

U.S. Pat. No. 3,900,573 discloses the use of certain inhibited or crosslinked starches in simulated meat products to produce a product that is stable under retort stabilization conditions. The patent indicates that mono- and diglycerides may be used as plasticizers in these products. The patent does not discuss, in any way, the manufacture of shrimp analog products, and with any lipid-amylose starch complex.

SUMMARY OF THE PRESENT INVENTION

An object of the present invention is to provide a shrimp analog product formed from heat coagulable vegetable protein as a primary protein, amylose containing starch and lipids capable of forming a complex with the amylose starch during a subsequent high temperature extrusion process. The resulting product has improved firmness and elasticity without detracting from the desired shrimp like texture of such products.

Another object of the present invention is to provide a process whereby shrimp analog products having improved firmness and elasticity, as well as desirable juiciness and chewiness properties may be prepared from an extrudable composition comprising heat coagulable vegetable protein, amylose containing starch and lipids which will form a complex with such starch.

These and other objects of the present invention are obtained by employing in such extrudable vegetable protein based compositions, amylose containing starch and a lipid which will form a complex with such starch at high temperatures, and then extruding the composition at a temperature of about 150° to 190° C. to form oriented fibers and by then binding the fibers at a temperature of about 95° to 110° C.

DESCRIPTION OF THE PREFERRED EMBODIMENTS

The extrudable compositions of the present invention to be used in preparing the shrimp analog products have the following compositions:

| Component of Extrudable Composition of Present Invention | Weight % Range of Component of Extrudable Composition | |
|---|---|---|
| | Broad | Preferred |
| Water | 15 to 40 | 25.0 ± 10 |
| Heat Coagulable Vegetable Protein | 50 to 84 | 67.0 ± 10 |
| Other Heat Coagulable Protein | ≧0 to 20 | 10 ± 5 |
| Non-Heat Coagulable Protein | ≧0 to 30 | 15 ± 5 |
| Amylose Containing Starch | 4 to 15 | 8.0 ± 3 |
| Complex Forming Lipid | 0.2 to 2 | 1.0 ± 0.5 | with the remainder being flavorants and colorants, to attain a total of 100%.

The components of the extrudable compositions of the present invention, other than the complex forming lipid, are as otherwise described above with reference to their use in the prior art extrudable compositions.

The preferred heat coagulable vegetable protein to be used in the extrudate and shrimp analog products of the present invention is soy protein isolate. These soy protein isolates have a protein content of above about seventy weight percent. Other heat coagulable proteins that may be used would include egg white, gluten, and lactalbumin. Heat non-coagulable proteins that may be used would include sodium and potassium caseinate. Soy protein isolate may be used as the sole or primary source of protein in the extrudate and shrimp analog products of the present invention. One or more sources of animal protein may also be used, for nutritional purposes, in combination with the heat coagulable vegetable protein in the extrudate and shrimp analog products of the present invention.

The term "soy isolate" or "soy protein isolate" means a product made by a, basically, three step process in which soy beans (1) have essentially all the soy bean oil therein extracted, (2) then have the soy flour therein precipitated out, and (3) then have the soy protein extracted therefrom with water. The extract is then dried. The final dried product or "soy isolate" contains at least 70, and preferably at least 85, weight % protein. It is also known as protein micelles. Procedures for making such products are disclosed in Canadian Pat. No. 1,028,552 and U.S. Pat. No. 4,366,097. The soy isolate is thus a highly functional food ingredient made from dehulled cleaned whole soy beans.

The amylose containing starches to be used in the extrudate and shrimp analog products of the present invention are, preferably, those containing about 15 to 50% amylose starch. Such high amylose content starches would include dent corn starch, rice starch, wheat starch, tapioca starch and potato starch. Starches such as waxy corn starch, which essentially consist of amylopectin are not useful in the products of the present invention since amylopectin cannot form the desired complexes with the complex forming lipid compounds. Flour that contains amylose containing starch such as corn flour, wheat flour and rice flour may also be used as a form of the amylose starch to be used in the products of the present invention.

The complex forming lipids which are to be used to form the amylose lipid complexes are well known in the art for such purposes. These complex forming lipids would include fatty acids and monoglycerides of fatty acids. These compounds all contain relatively long hydrocarbon chains attached to hydrophilic groups. It is believed that at temperatures above the gelatinzation temperature of the starch, the amylose fraction of the starch complexes with these complex forming lipid molecules by forming a helix around them. In preparing the shrimp analog products of the present invention the lipid-amylose complex is formed when the amylose containing starch is gelatinized in the high temperature extrusion process used to prepare the extrudate and shrimp analog products, and it is such complexes which provide the significant improvement in the texture of the extrudate that provide the desired elasticity and firmness characteristics corresponding to those of natural shrimp. The use of either the amylose containing starch, or the complex forming lipid, alone, will not produce the desired results in the extrudate or shrimp analog products of the present invention.

The formation of amylose-lipid complexes under high temperature extrusion conditions can be determined by X-ray diffraction analysis (*Cereal Chemistry*, Volume 57, page 4, 1980).

The extrudable composition of the present invention are processed through the extrusion and binding steps as was done with the prior art extrudable compositions while employing, however, the following essential conditions of temperature: extrusion into oriented fibers at 150° to 190° C., followed by binding of the fibers at 95° to 110° C.

The following examples are merely illustrative of the present invention and are not intended as a limitation upon the scope thereof.

EXAMPLE 1

An extrudable composition was prepared by mixing together in a bench top Hobart mixer at a number 2 speed for 20 minutes, 900 grams of soy protein isolate, 100 grams of dent corn starch, 10 grams of glyceryl monostearate and 340 grams of water.

The extrudable compositions thus contained, by weight, about 25.2% water, 66.6% soy protein, 7.4% dent corn starch and 0.7% glyceryl monostearate.

The resulting composition was then extruded in an ⅜ inch Brabender extruder having the following temperatures in the following three zones therein: 100° C. in the feed zone, 170° C. in the melting zone and 130° C. in the die zone. The extruder screw was operated at 64 revolutions per minute using a 3:1 compression ratio screw.

The extrudate was passed from the extruder through a die in the form of an oriented, fibrous rope having an average diameter of about ½ inch. The extrudate expanded about 100% of its diameter as it exited the extruder.

The extrudate was immediately passed from the extruder into a hydration bath held at a temperature of 25° to 90° C. The hydration bath was a 1% dry weight aqueous solution of sodium chloride. The extrudate was held in the hydration bath for 60 minutes and then taken from the hydration bath and compressed to remove excess salt solution therefrom so as to provide a solids content of 65-75%, and was then mixed with a binder solution and placed in a shrimp mold. The binder solution was an aqueous solution of 17 weight % soy protein isolate, 6 weight percent egg albumin and 1 weight % sodium chloride. The binder solution was heat set at 100° C. for 10 minutes and the resulting shrimp shaped product removed the mold.

The resulting analog product closely resembled the texture of natural shrimp and was firmer and more elastic than a comparable analog product made from the same formulation as that used in the Example above but made without the lipid component and under the same conditions of the extrusion and binding steps.

The replacement of glyceryl monostearate with corn oil, at the same level (amount) of glyceryl monostearate that was used, did not provide an extrudate having the desired firmness and elasticity.

EXAMPLE 2

Shrimp analog products were made as in Example from the following recipe:

| Component of Recipe | Weight % of Component In Recipe |
| --- | --- |
| Water | 25.0 |
| Soy Protein Isolate | 22.5 |
| Egg Albumin | 17.3 |
| Sodium Caseinate | 17.3 |
| Wheat Gluten | 9.4 |
| Wheat Flour | 7.5 |
| Oleic Acid | 1.0 |
| | 100.0 |

The resulting shrimp analog product had the firmness and elasticity textural characteristics of natural shrimp, and had a high nutritional quality.

The extrudate and shrimp analog products of the present invention have an elastic, firm, shrimp like texture due to the presence of a lipid-amylose complex therein that is formed during the high temperature processing of the extrudate. Although extruded products can be made from the prior art formulations and have chewy properties, the firmness and elasticity of natural shrimp will be lacking in such products. Furthermore, such prior art formulations can only be extruded with a great deal of difficulty. Such prior art formulations, with their high vegetable protein contents are prone to a great deal of surging during the extrusion process which makes it impossible to produce products of a uniform texture due to the fluctuation of the extrudates residence time in the extruder. Uniform production rates also cannot be maintained under such conditions. However, the compositions of the present invention do not experience this surging phenomenon and uniformly textured products can be produced from these compositions at uniform production rates.

What is claimed is:

1. A fibrous extrudate of improved shrimp-like firmness and elasticity formed from a composition which comprises: water from about 15 to about 35 weight percent, heat coagulable vegetable protein from about 57 to about 77 weight percent, other heat coagulable protein from 0 to about 20 weight percent, non-heat coagulable protein from 0 to about 30 percent, amylose containing starch from about 4 to about 15 weight percent and a complex forming lipid from about 0.2 to about 2 weight percent; wherein said complex forming lipid is selected from the group consisting of fatty acids and monoglycerides of fatty acids said starch and lipid existing as an amylose-lipid complex in said extrudate.

2. A fibrous extrudate of improved shrimp-like firmness and elasticity formed from a composition which comprises: water from about 15 to about 35 weight percent, heat coagulable vegetable protein from about 57 to about 77 weight percent, other heat coagulable protein from about 5 to about 15 weight percent, non-heat coagulable protein from about 10 to about 20 weight percent, amylose containing starch from about 5 to about 11 weight percent and a complex forming lipid from about 0.5 to about 1.5 weight percent; wherein said complex forming lipid is selected from the group consisting of fatty acids and monoglycerides of fatty acids said starch and lipid existing as an amylose-lipid complex in said extrudate.

3. A shrimp analog formed from the fibrous extrudate of claim 2 by a process that comprises hydrating said fibrous extrudate and binding the hydrated fibrous extrudate.

4. A fibrous extrudate as claimed in claim 2 wherein said complex forming lipid is glycerol monostearate.

5. A shrimp analog as claimed in claim 13 wherein said complex forming lipid is glyceryl monostearate.

6. A fibrous extrudate as claimed in claim 2 wherein said complex forming lipid is oleic acid.

7. A shrimp analog as claimed in claim 3 wherein said complex forming lipid is oleic acid.

8. A fibrous extrudate as claimed in claim 2 wherein said amylose containing starch is selected from the group consisting of dent corn starch, rice starch, wheat starch, tapioca starch and potato starch.

9. A fibrous extrudate as claimed in claim 8 wherein said amylose containing starch is in the form of flour; said flour selected from the group consisting of corn flour, wheat flour and rice flour.

10. A shrimp analog formed from the fibrous extrudate of claim 9 by a process that comprises hydrating said fibrous extrudate and binding the hydrated fibrous extrudate.

11. An improved fibrous extrudate having shrimp-like firmness and elasticity formed from a composition comprising water, heat coagulable protein, other heat coagulable protein, non-heat coagulable protein, an amylose containing starch and a complex forming lipid selected from the group consisting of fatty acids and monoglycerides of fatty acids, wherein the improvement comprises the formation of an amylose lipid complex during an extrusion process.

12. An improved shrimp analog formed from a binder and a fibrous extrudate formed from a composition comprising water, heat coagulable vegetable protein, other heat coagulable protein, non-heat coagulable protein, an amylose containing starch and a complex forming lipid selected from the group consisting of fatty acids and monoglycerides of fatty acids, wherein said improvement comprises the formation of an amylose-lipid complex during an extrusion process.

13. A process of forming a fibrous extrudate as claimed in claim 9 wherein the temperatures of extrudation in preparing the extrudate are from about 150° to about 190° C.

14. A process of forming a shrimp analog as claimed in claim 10 wherein the temperatures of extrudation in preparing the extrudate are from about 150° to about 190° C. and the temperatures employed in binding are from about 95° to about 110° C.

* * * * *